April 7, 1959

G. M. WIDELL ET AL 2,880,760

HARMONIC EXCITER VALVE

Filed Aug. 24, 1956

INVENTOR.
GEORGE M. WIDELL
JAMES M. EASTMAN
BY
Robert C. Smith
ATTORNEY

United States Patent Office 2,880,760
Patented Apr. 7, 1959

2,880,760

HARMONIC EXCITER VALVE

George M. Widell and James M. Eastman, South Bend, Ind., assignors to Bendix Aviation Corporation, South Bend, Ind., a corporation of Delaware Application August 24, 1956, Serial No. 606,011

7 Claims. (Cl. 138—37)

This invention relates to equipment for determining the dynamic characteristics of hydraulic devices and more particularly to a valve structure for imparting a sinusoidal pulsation to the fluid flow to said devices.

In order to determine the dynamic characteristics of various hydraulic devices such as valves, governors, fuel controls, gauges, engines, etc., it is usually desired to measure fluid flow under transient conditions. One well known method of dynamic analysis is referred to as the frequency response method wherein an input flow is given a pulsating characteristic and the response of the device tested is measured at different frequencies. One of the problems presented by this type of analysis is that of providing a device which is capable of producing a satisfactory sinusoidal pulsation in the fluid flow. Passing this pulsating flow through a fixed restriction will produce a pulsating pressure at the output of the device.

It is another object of the present invention to provide a means for imposing periodic pressure pulsation upon a flow of fluid.

It is therefore an object of the present invention to provide a means for imposing a periodic pulsation upon a flow of fluid.

It is another object of the present invention to provide a valve which will accomplish the above objects and which is easily adjustable as to both frequency and amplitude of the pulsations.

It is a further object to provide a harmonic exciter valve which will accomplish the above objects and which is structurally simple and trouble-free in operation.

Other objects will become apparent from the following specification taken in connection with the accompanying drawings, in which.

Figure 1:
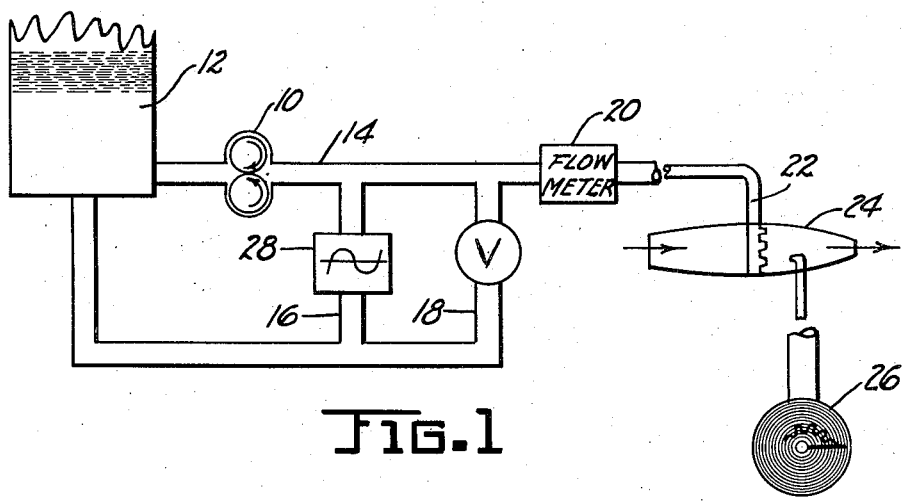
Figure 1 is a schematic drawing showing a typical testing arrangement using our exciter valve.

Referring to Figure 1, a pump 10 is shown pumping fuel from a reservoir 12. This fuel is forced along a conduit 14 and part of it is bypassed to the inlet side of the reservoir 12 through two by-pass conduits 16 and 18. Fuel not by-passed is caused to flow through a flowmeter 20 to the manifold 22 of a gas turbine engine 24. A recording pressure pick-up 26 is installed in the tailpipe of the engine and records pressure variations in the engine resulting from variations in fuel flow. Should it be desired to test for speed or temperature variations, a recording speed or temperature sensing device may be used. By-pass conduit 16 contains our harmonic exciter valve 28 which imparts a sinusoidal pulsation to the fuel flow through said branch and, inasmuch as this flow is a direct subtraction from the main flow in conduit 14, the main flow, then, also receives a sinusoidal pulsation. By-pass channel 18 provides a means for varying the general flow level to the flowmeter 20 and the manifold 22. Certain dynamic characteristics of the engine 24 can be ascertained by impressing a pulsation of a desired frequency and magnitude upon the fuel flow to the engine as an input and then comparing the output of the engine, as exemplified by some operating condition such as tailpipe pressure, with this input. At low frequencies of input, the output may be expected to follow rather closely. As frequency of input increases, the output will tend to lag, and then, upon further increase, it will become essentially unresponsive to the variations in the input. Our valve may be utilized in a similar operation such as that shown in copending application Serial No. 357,661 (common assignee) filed May 27, 1953 in the name of Rudolph Bodemuller. Or it may be used in an optimalizing type of control such as shown in application Serial No. 577,001 (common assignee) filed April 9, 1956 in the name of James M. Eastman.

Figure 2:
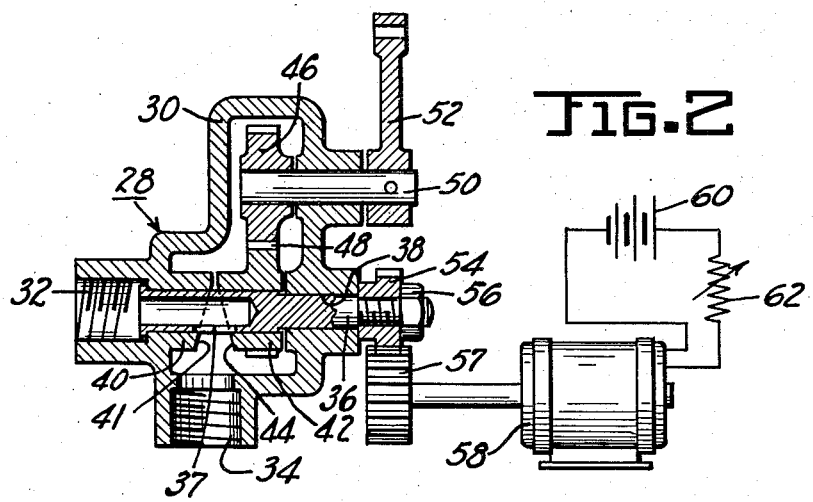
Figure 2 is a sectional drawing of our harmonic exciter valve.

Figure 2 shows a sectional view of our harmonic exciter valve 28. This valve structure includes a housing 30 having an inlet port 32 and an outlet port 34. Communication between said ports is controlled by means of a movable valve member 36 having a thin slot 37, said valve member being adapted to be rotated in a bore 38 in said housing. One end of member 36 is supported by a cylindrical sleeve portion 40 having a contoured edge 41. Also positioned within housing 30 and concentric with valve member 36 is a rotatably adjustable auxiliary sleeve 42 which has a contoured edge 44. These edges are shown as having straight contours, but these contours may be varied to produce any desired wave form for the fluid flow pulse. Sleeve 42 is rotatably movable to a fixed position relative to sleeve portion 40 through the action of a gear 46 drivably engaged with member 42 by means of gear teeth 48. Gear 46 is pinned to a shaft 50 which, in turn, is pinned to a lever 52 outside of housing 30. A driving member 54, which may be a gear, is held tightly engaged with valve member 36 by means of a nut 56. Member 54 is engaged with a gear 57 driven by a source of power capable of imparting an adjustable rotational velocity to member 36. This may involve any of a number of arrangements well known to those skilled in the art. In the version shown, it consists of a D.C. motor 58 having a field winding which is energized by means of a power source 60, the output of which is variable by means of a variable resistance 62.

In operation, fluid is supplied under pressure to inlet port 32, where it is channelled to the interior of valve member 36, passes through an orice defined by slot 37 and contoured sleeve edges 41 and 44, and through outlet port 34. The effective area of the orifice is varied as the slot 37 is moved past the edges 41 and 44. It can be shown that when a slot passes even one sleeve edge like numeral 41 or 44, and the edge is defined by a plane surface intersecting the cylindrical bore at at angle from the bore centerline, the uncovered length of the slot varies as the sine of the angle of rotation. When the slot passes two such edges, the opening will still vary as the sine of the angle of rotation. This becomes apparent when one considers that the area really involves the sum of two sine functions of equal frequency which is also a sine function. The amplitude of the pulsation will vary from a maximum when the edges 41 and 44 are opposed as illustrated, to zero when they are parallel. When the edges are parallel, the sine functions cancel and a substantially steady flow results. For this condition the area of the orifice is the mean area that exists for all amplitudes. The flow through the orifice is variable as to amplitude of the pulsations by means of rotation of member 42 with respect to member 40 and as to frequency by means of varying the angular velocity of valve member 36. It is apparent from the foregoing that the valve arrangement uniquely provides a simple means of generating a sinusoidal flow and of varying its amplitude.

Figure 3:
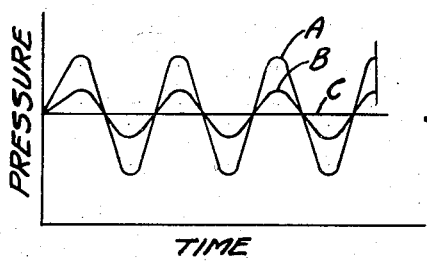
Figure 3 is a graph showing the manner in which the fluid pressure varies as a result of the operation of our valve.

Figure 3 is a graph showing the manner in which the fluid pressure varies as a result of the operation of our valve. Assuming member 42 to be positioned substantially as illustrated, a graph of amplitude vs. time will show the output of valve 28 to be substantially as shown in curve A. A rotation of member 42 by about 90° with respect to member 40 will produce a pressure substantially as shown in curve B. When members 42 and 40 are so arranged that edges 41 and 44 are parallel (180° rotation of member 42) the pressure output will be substantially as shown at curve C, having no significant periodic pulsation. This characteristic holds true irrespective of whether a gas or a liquid is passed through valve 28. Where a gas is used, the testing procedure and operation of the valve is the same as shown and described herein.

While only one embodiment is shown and described herein, it is recognized that changes may be made to suit the requirements of a given application.

We claim:

1. A device for impressing periodic pulsations upon the fluid flow through a conduit comprising a housing having an inlet port and an outlet port, and means controlling communication between said ports including a hollow cylindrical valve member having an axial slot in the sidewall thereof, a supporting member for said valve member having a tapered edge, a rotatably adjustable sleeve member concentrically positioned with respect to said valve member having a tapered edge, said edges cooperating with said slot to define an orifice, means for adjusting said sleeve member with respect to said support member, and means for continuously rotating said valve member at a desired speed to thereby determine the frequency of said pulsations.

2. A device for impressing periodic pulsations upon the fluid flow through a conduit comprising a housing having an inlet port and an outlet port, and means controlling communication between said ports including a hollow rotatable valve member having an axial slot in the sidewall thereof, a support for said valve member having a tapered edge, a sleeve member concentrically positioned with respect to said valve member and having a tapered edge, said edges cooperating with said slot to define an orifice, and means for adjusting said sleeve member with respect to said support member to vary the amplitude of said periodic pulsations.

3. A device for impressing periodic pulsations upon the fluid flow through a conduit comprising a housing having an inlet port and an outlet port, and means controlling communication between said ports including a hollow rotatable valve member having an axial slot in the sidewall thereof, a fixed member having a tapered edge concentrically positioned with respect to said valve, a sleeve member having a tapered edge concentrically positioned with respect to said valve member, said edges cooperating with said slot to define an orifice, means for adjusting said sleeve member with respect to said fixed member to vary the amplitude of said periodic pulsations, and means for rotating said valve member at a desired speed to thereby determine the frequency of said pulsations.

4. A device for impressing periodic pulsations upon the fluid flow through a conduit comprising a housing having an inlet port and an outlet port, first means defining a rectangular slot, second means concentric with said first means including a first member having a tapered edge, a second member concentric with said first means having a tapered edge, said edges cooperating with said slot to define orifice, an adjusting device for positioning one of said members rotatably with respect to said other member to vary the amplitude of said periodic pulsations, and means for continuously rotating one of said means with respect to the other at a desired speed to thereby determine the frequency of said pulsations.

5. A device for impressing periodic pulsations upon the fluid flow through a conduit comprising a housing having an inlet port and an outlet port, and means controlling communication between said ports including a hollow rotatable valve member and means defining the flow path through the sidewall thereof, a fixed sleeve member concentric with said valve member having a tapered edge, an adjustable sleeve member concentrically positioned with respect to said valve member and having a tapered edge, said edges cooperating with said flow path to define the effective area of the restriction, means for adjusting said adjustable sleeve member with respect to said fixed sleeve member to vary the amplitude of said periodic pulsations, and means for rotating said valve member at a desired speed to determine the frequency of said pulsations.

6. A device for impressing periodic pulsations upon the fluid flow through a conduit comprising a housing having an inlet port and an outlet port, first means for defining an orifice in said housing, second means operable to continuously vary the size of said orifice within certain limits at a selective rate to provide a periodic pulsation upon the fluid flow, third means operable with said first and second means for varying the limits of said orifice size to provide amplitude variation of said periodic pulsation.

7. A device for impressing periodic pulsations upon the fluid flow through a conduit comprising a housing having an inlet port and an outlet port, first means for defining a flow restriction in said housing, second means operable to continuously vary the amount of said flow restriction within certain limits at a selective rate to provide a periodic pulsation upon the fuel flow, third means operable with said first and second means for varying the limits of the flow restriction change to provide amplitude variation of said periodic pulsations.

References Cited in the file of this patent
UNITED STATES PATENTS
655,608     Cooper _____ Aug. 7, 1900